A. KATZENSTEIN.
ATTACHMENT FOR WIND SHIELDS.
APPLICATION FILED OCT. 26, 1917.
1,277,083.
Patented Aug. 27, 1918.
2 SHEETS—SHEET 2.
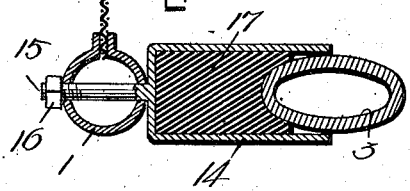
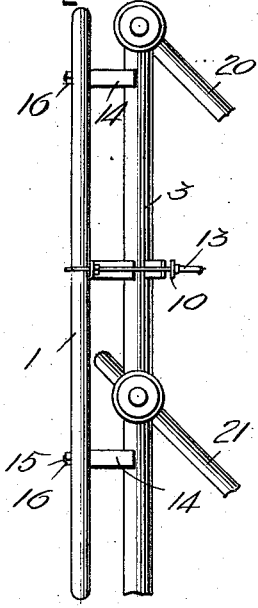
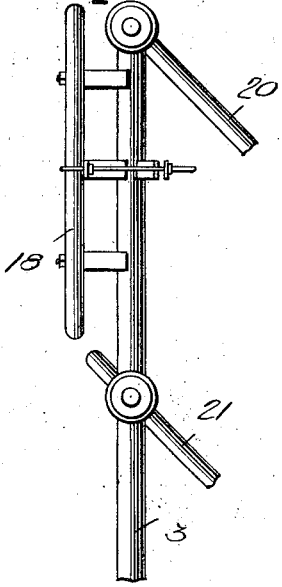
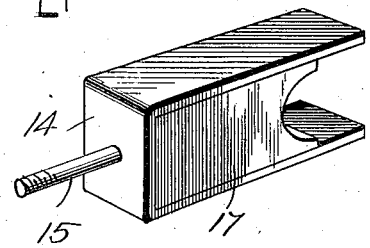
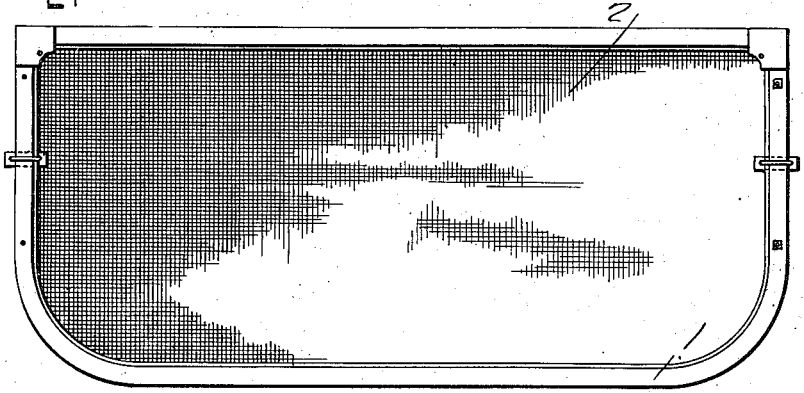
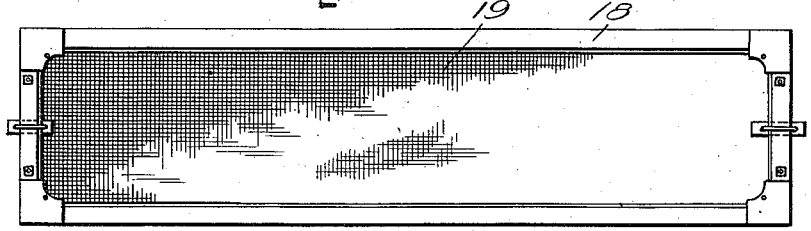
WITNESSES
John H. Phillips Jr.
INVENTOR
AARON KATZENSTEIN,
BY
ATTORNEYS

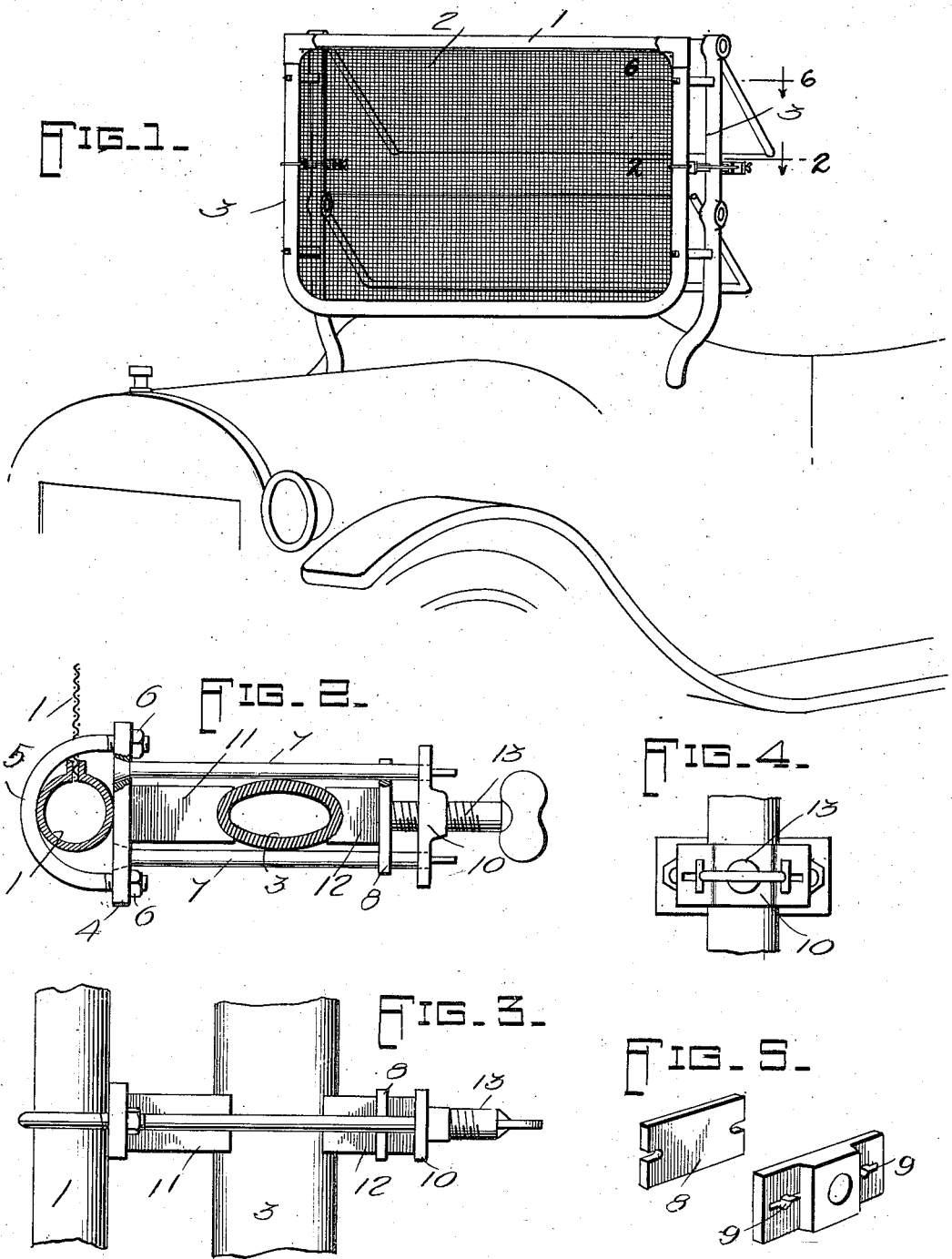

UNITED STATES PATENT OFFICE.

AARON KATZENSTEIN, OF SHREVEPORT, LOUISIANA.

ATTACHMENT FOR WIND-SHIELDS.

1,277,083. Specification of Letters Patent. Patented Aug. 27, 1918.

Application filed October 26, 1917. Serial No. 198,659.

*To all whom it may concern:*

Be it known that I, AARON KATZENSTEIN, a citizen of the United States, and a resident of Shreveport, in the parish of Caddo and State of Louisiana, have invented certain new and useful Improvements in Attachments for Wind-Shields, of which the following is a specification.

My invention is an improvement in attachments for wind shields, and has for its object to provide an attachment of the character specified consisting of a frame having a filling of perforate material, for preventing the passage of insects and the like, which will render night driving possible without the use of goggles and the like.

In the drawings:

Figure 1 is a perspective view of the front of a motor vehicle provided with the improved attachment;

Figs. 2 and 6 are sections on the lines 2—2 and 6—6, respectively, of Fig. 1, each view looking in the direction of the arrow adjacent the line;

Fig. 3 is a plan view of Fig. 2;

Fig. 4 is an end view;

Fig. 5 is a perspective view of the nut and abutment plate;

Fig. 7 is a perspective view of one of the snubbers;

Fig. 8 is an end view showing a portion of the wind shield, with the attachment in place;

Fig. 9 is a front view of the attachment;

Fig. 10 is a similar view of another type of attachment;

Fig. 11 is a view similar to Fig. 8 of the type of Fig. 10 in use.

In the embodiment of the invention shown in Figs. 1 to 9, inclusive, the attachment comprises a frame 1 of suitable material having a filling 2 of perforate material, as, for instance, wire cloth of suitable mesh, the mesh depending upon the conditions to be met. This frame is of approximately the size of the wind shield, and is supported in front of the shield, being connected to the supporting brackets 2 for the shield. The frame is supported by two clamps and four snubbers or buffers.

Each of the clamps consists of a plate 4 having connected therewith an arch bar 5 whose arms are passed through openings in the ends of the plate and are threaded for engagement by nuts 6 to clamp the frame 1 to the plate 4. Rods 7 are passed through the plate inside the openings for the arms of the arch bar, and the said rods have tapering heads which are countersunk in the plate, as shown in Fig. 2. At their opposite ends these rods pass through notches in the ends of an abutment plate 8, and then through openings 9 in the ends of a plate 10.

Rubber blocks 11 and 12 are arranged between the brackets 3 and the plates 4 and 8, respectively, the said blocks having their inner ends recessed to fit the bracket. A set screw 13 is threaded through the nut 10 into engagement with the abutment plate, and the ends of the rods 7 adjacent to the nut have cross heads which are turned transversely of the slots 9 to connect the nut with the plate 4. It will be obvious that when the set screw is turned in the proper direction the plates 4 and 8 will be forced toward each other and toward the bracket 3 to tightly compress the clamp upon the bracket.

Each of the snubbers or buffers consists of a substantially U-shaped member 14, the body of the said member having a threaded stem 15 which is passed through openings in the frame 1 and engaged by a nut 16 to connect the said member with the frame. A block 17 of rubber is arranged within the U-shaped member and the inner end of this block is recessed, as shown in Figs. 6 and 7, to fit the bracket.

The clamps are arranged intermediate the ends of the end members of the frame 1, at approximately the centers thereof, and the snubbers are arranged in pairs, a pair at each end of the frame, and the members of each pair are above and below the clamp. The blocks 11 of the clamps are slightly shorter than the blocks 17 of the snubbers, so that the natural resiliency of the frame will, when the clamps are tightened, hold the snubbers firmly in place and prevent any rattling of the same. It will be evident that the improved attachment may be connected with any form of motor vehicle, and it will be understood that the frame in size will depend upon the space to be covered.

In that type shown in Figs. 10 and 11 the frame 18 is rectangular and is narrower than the frame shown in Fig. 9. The frame has the filling 19 of perforate material, and it is connected to the brackets 3 in the same manner as the frame 1 is connected. The frame 1 covers both sections 20 and 21 of the wind shield, while the frame 18 covers only the section 20 of the wind shield.

I claim:

1. An attachment for wind shields comprising a frame having a filling of perforate material and adapted to be arranged in front of the wind shield, and means for connecting the frame to the brackets supporting the wind shield, said means comprising clamps intermediate the ends of the frame and snubbers arranged above and below each clamp, each snubber comprising a U-shaped member consisting of a body connected to the frame and arms adapted to extend on opposite sides of the bracket, and a rubber plug held between the arms and body.

2. An attachment for wind shields comprising a frame having a filling of perforate material and adapted to be arranged in front of the wind shield, and means for connecting the frame to the brackets supporting the wind shield, said means comprising clamps intermediate the ends of the frame and snubbers arranged above and below each clamp, each clamp comprising a plate connected with the frame, rods extending from the frame on opposite sides of the bracket, an abutment plate having notches at its ends for engagement by the rods, rubber buffers between the plate and the bracket, and means connected with the rods for forcing the abutment plate toward the bracket.

AARON KATZENSTEIN.

Witnesses:
C. A. HILBURN,
SIDNEY HEADMAN.